J. WHITTAKER, R. BRADSHAW & J. BRIGGS.
AUTOMATIC WEFT REPLENISHING MECHANISM OF LOOMS FOR WEAVING.
APPLICATION FILED JUNE 27, 1911.
1,151,915.
Patented Aug. 31, 1915.
7 SHEETS—SHEET 1.
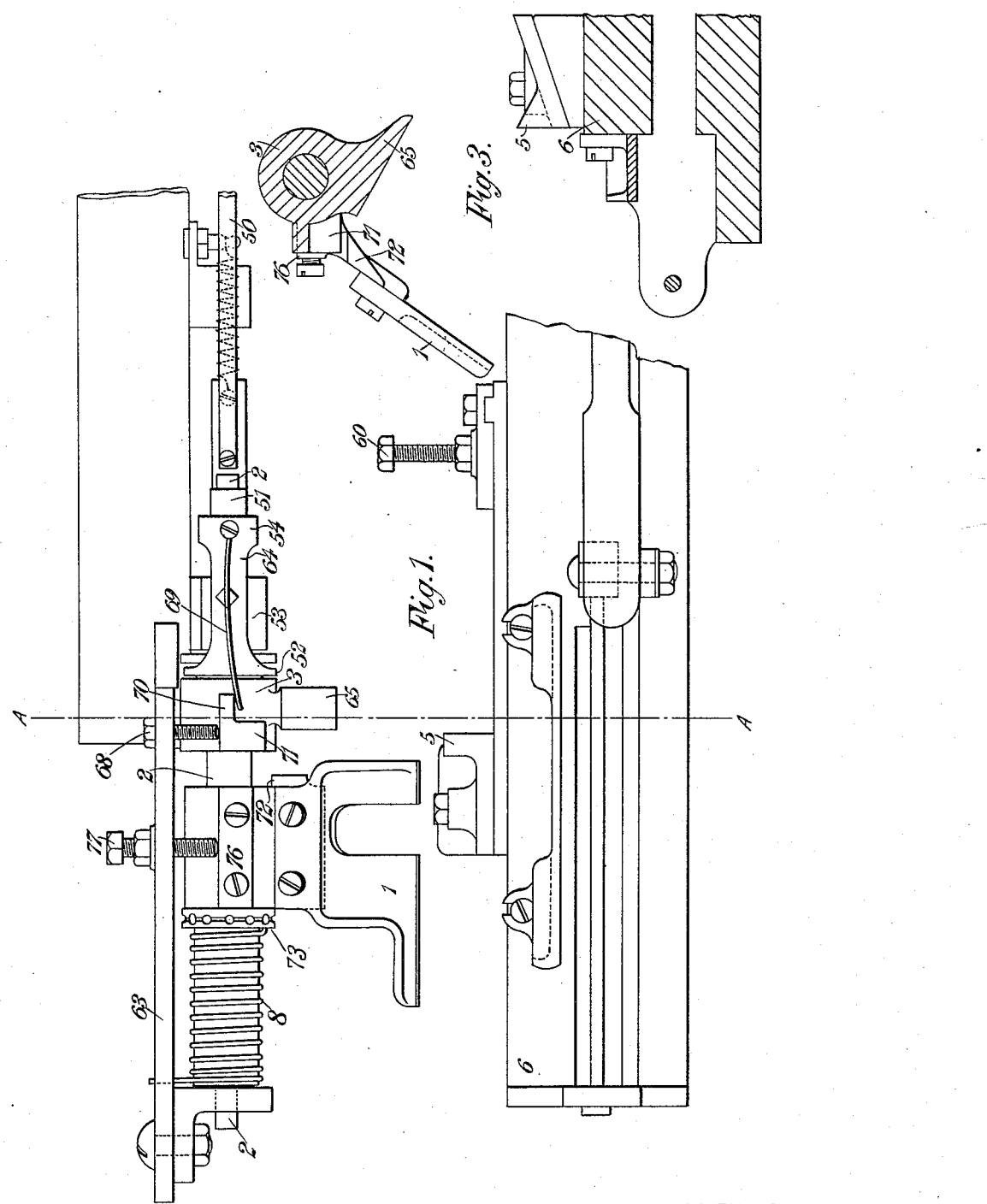
INVENTORS:
JOHN WHITTAKER,
RICHARD BRADSHAW,
JOSEPH BRIGGS.

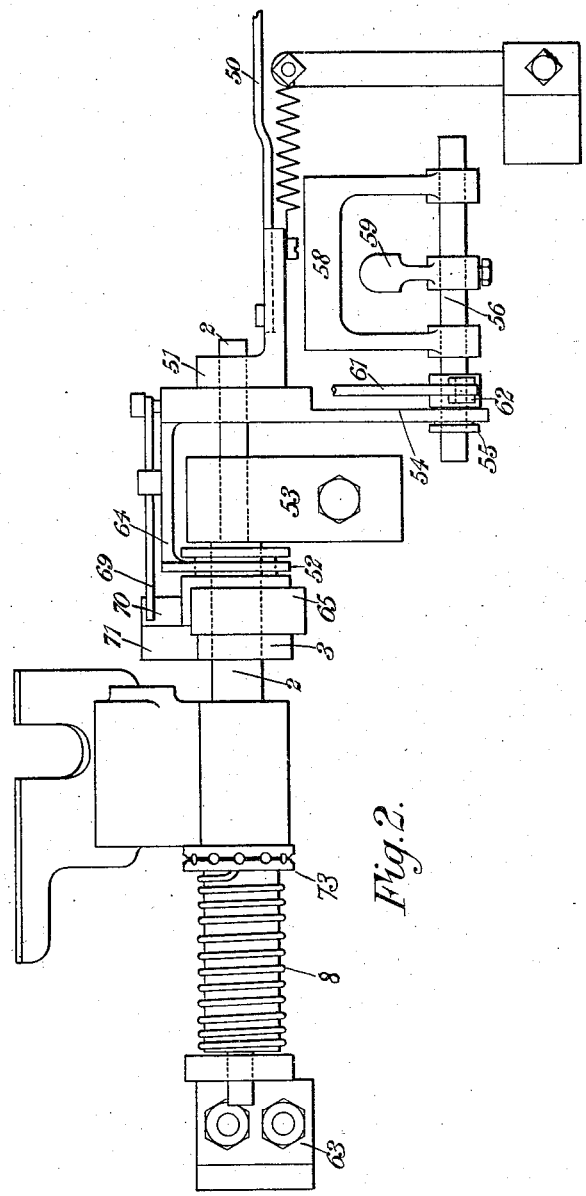

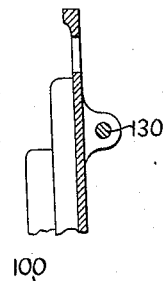
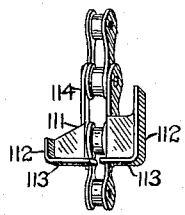
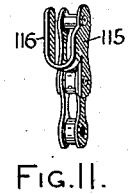
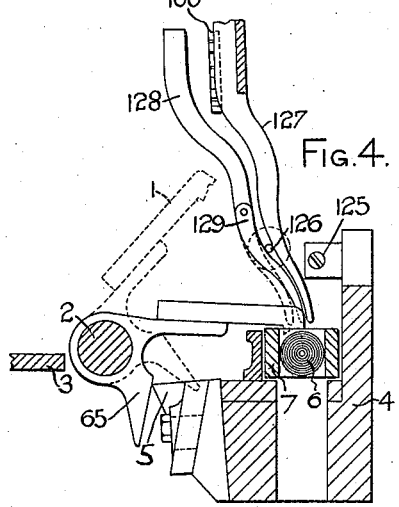
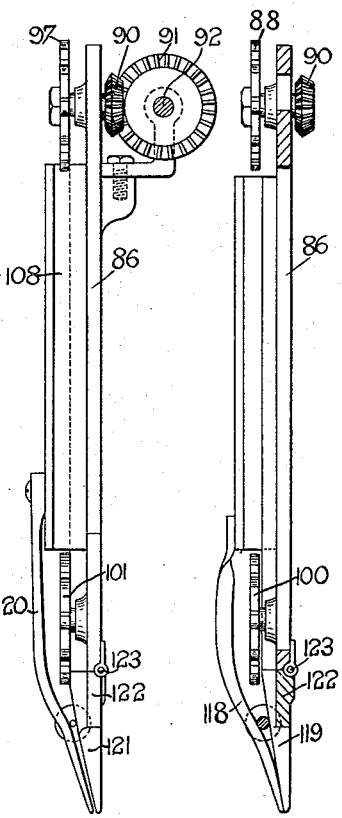
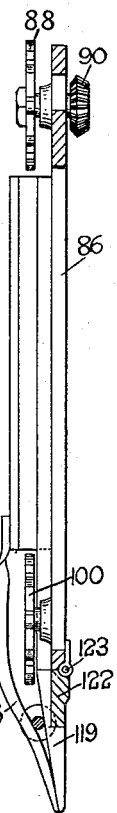
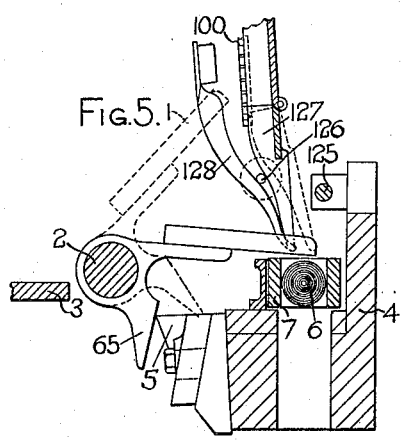

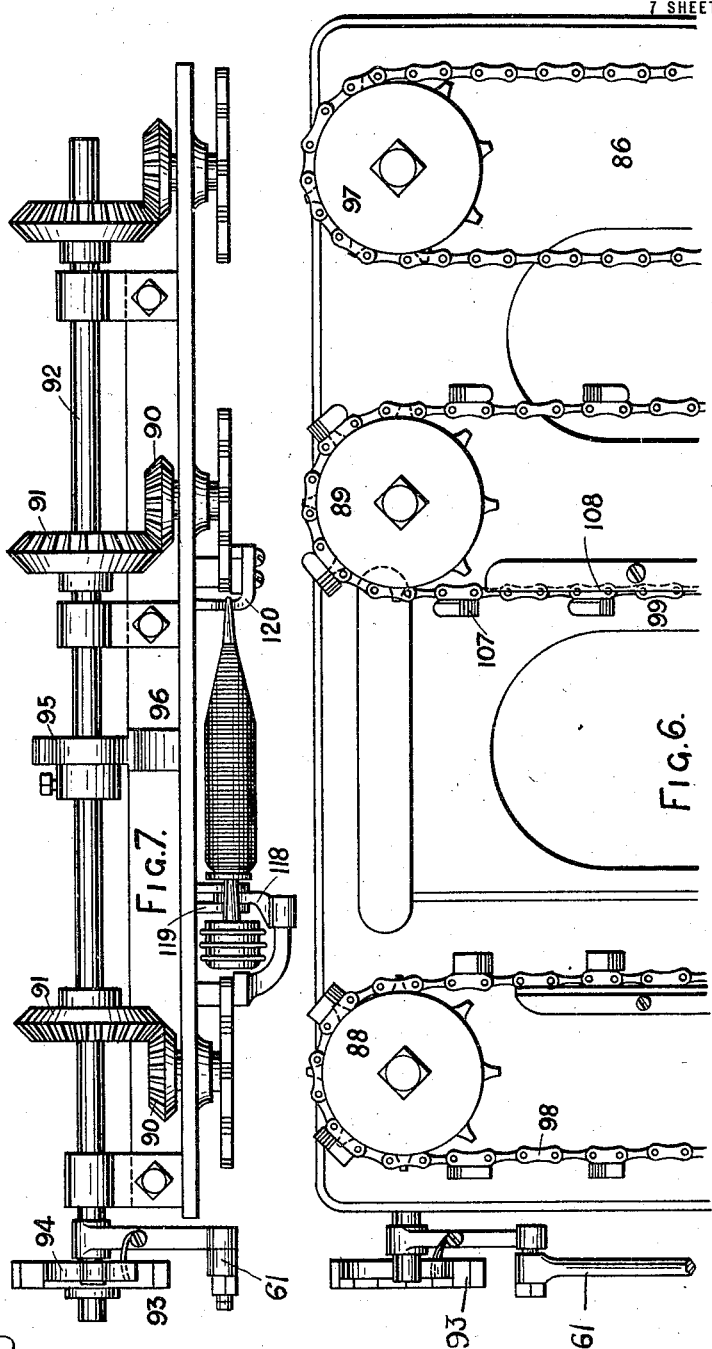

J. WHITTAKER, R. BRADSHAW & J. BRIGGS.
AUTOMATIC WEFT REPLENISHING MECHANISM OF LOOMS FOR WEAVING.
APPLICATION FILED JUNE 27, 1911.
1,151,915.
Patented Aug. 31, 1915.
7 SHEETS—SHEET 5.
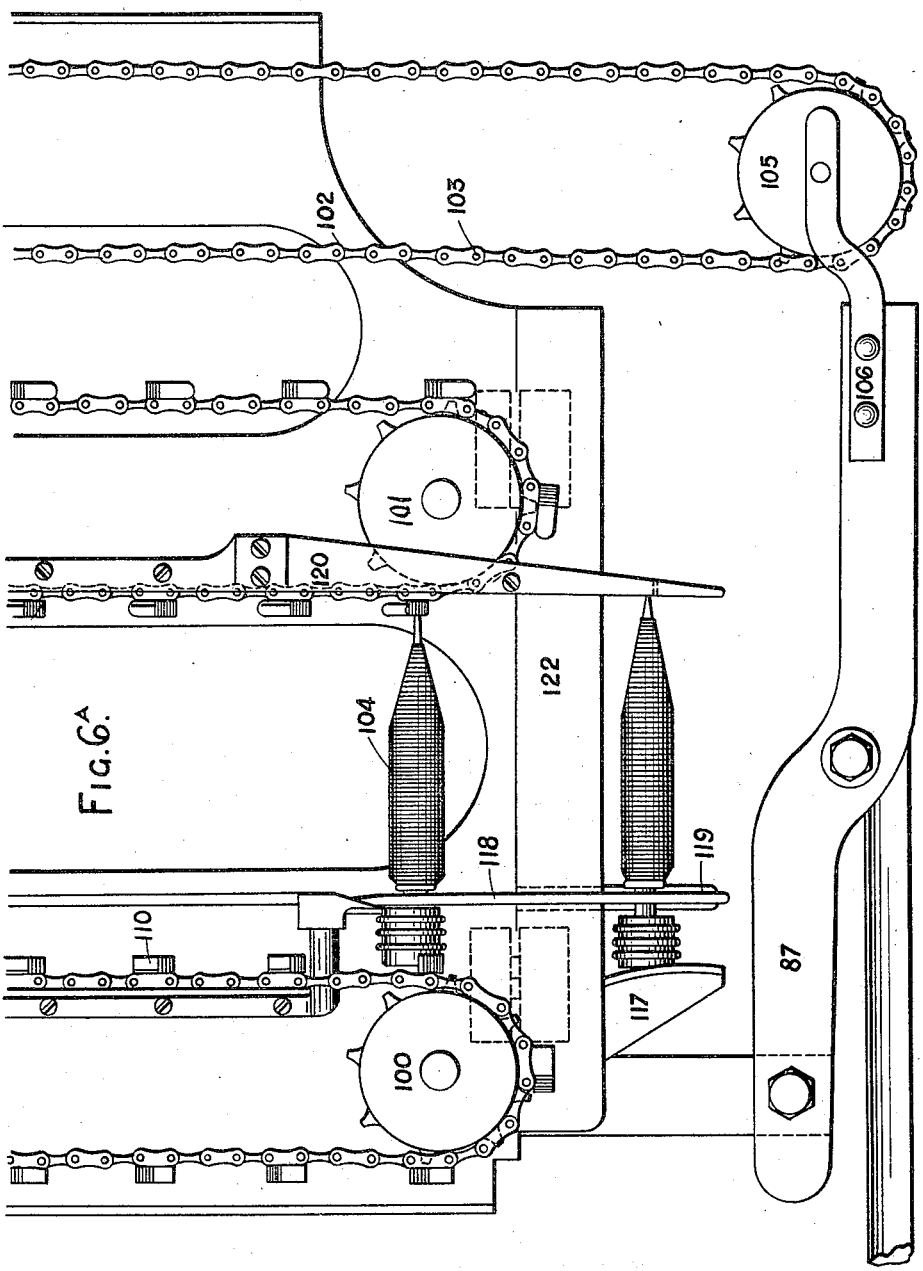

J. WHITTAKER, R. BRADSHAW & J. BRIGGS.
AUTOMATIC WEFT REPLENISHING MECHANISM OF LOOMS FOR WEAVING.
APPLICATION FILED JUNE 27, 1911.

1,151,915.

Patented Aug. 31, 1915.
7 SHEETS—SHEET 7.

WITNESSES

INVENTORS:
JOHN WHITTAKER,
RICHARD BRADSHAW,
JOSEPH BRIGGS.
PER
ATTORNEYS

UNITED STATES PATENT OFFICE.

JOHN WHITTAKER, RICHARD BRADSHAW, AND JOSEPH BRIGGS, OF RISHTON, NEAR BLACKBURN, ENGLAND.

AUTOMATIC WEFT-REPLENISHING MECHANISM OF LOOMS FOR WEAVING.

1,151,915.    Specification of Letters Patent.    Patented Aug. 31, 1915.

Application filed June 27, 1911. Serial No. 635,624.

*To all whom it may concern:*

Be it known that we, JOHN WHITTAKER, RICHARD BRADSHAW, and JOSEPH BRIGGS, subjects of the King of the United Kingdom of Great Britain and Ireland, and residing at Wellington Mill, Rishton, near Blackburn, in the county of Lancaster, England, have invented new and useful Improvements in or Relating to Automatic Weft-Replenishing Mechanism of Looms for Weaving, of which the following is a specification.

This invention relates to automatic weft-replenishing mechanism for looms for weaving and has among its several objects (*a*) to provide means whereby the transferrer is operated to transfer a cop when the weft stop motion is actuated on failure of the weft; (*b*) to provide a weft-replenishing mechanism which can be readily fitted to over-pick looms of the ordinary type without entailing any serious alteration of the looms. Certain portions of this part of the invention are, however, applicable to weft-replenishing mechanism of every kind; (*c*) to facilitate the fitting of weft-replenishing mechanism to over-pick looms.

Figure 12:
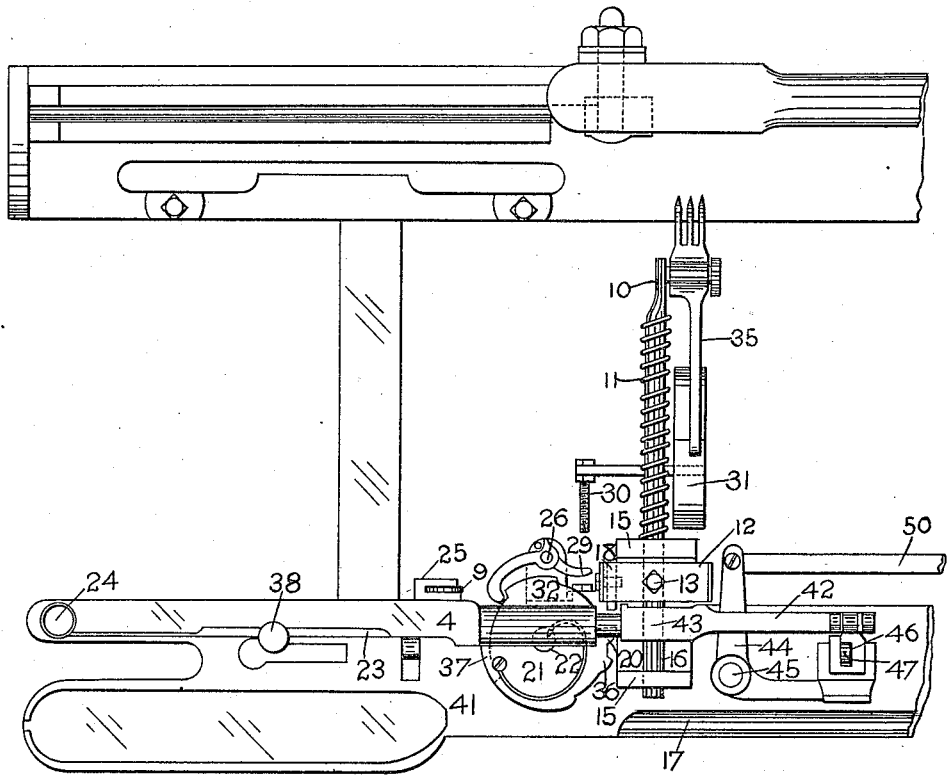
Figure 13:
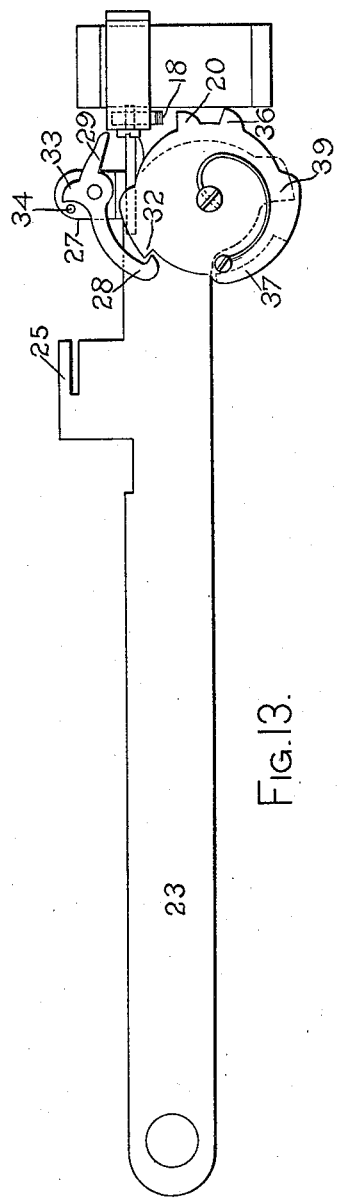
Figure 14:
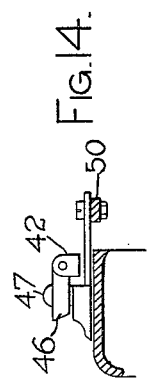
Figure 15:

In the accompanying drawings Figure 1 is a detached plan view showing the front part of one end of a loom fitted with our said improvements in the transferring mechanism of automatic weft-replenishing mechanism of looms. Fig. 2 is a view of certain parts thereof as seen from the back of the loom; Fig. 3 is a section taken along the line A A of Fig. 1, looking toward the left of that figure and with certain parts omitted; Fig. 4 is an end sectional view of parts of a loom showing part of the slay with shuttle, a transferrer and the jaws of a pivoted magazine; Fig. 5 is a similar view of the same parts except that the pivoted jaws of a fixed magazine are shown; Figs. 6 and 6ª are together a front elevation of the fixed cop magazine; Fig. 7 is a plan thereof; Fig. 8 is an end view of the right-hand portion thereof with the chains removed; Fig. 9 is an end view, partly in section, of the left-hand portion thereof with the chains removed; Figs. 10 and 11 are views of the skewer carriers; Fig. 12 is a detached plan view showing the left-hand end of the front part of a loom; Fig. 13 is an enlarged plan view of the lever 23 and its attachments; Fig. 14 is an end view of the device for disconnecting the automatic weft-replenishing mechanism; and Fig. 15 is an end view of a pawl pivoted on the block 12.

According to our invention the magazine containing cops is situated at one end of the loom near the shuttle box. A pivoted piece, hereafter called a transferrer, is pivotally fixed at the end of the breast-beam. The magazine and the transferrer are so placed in relation to the shuttle when this latter is in the shuttle box, that the transferrer, on being turned about its pivot, takes a cop from the magazine and presses it into the shuttle, at the same time forcing the empty cop out of the shuttle. The transferrer 1 is fixed on a shaft 2 which is carried in two brackets 53 and 63 fixed to the breast-beam 4. A spiral spring 8 is attached at one end to the bracket 63 and at the other end to a collar 73 on the transferrer, the collar 73 being provided with a number of holes to permit of adjustment of the spring. The action of the spring 8 is to turn the transferrer away from the shuttle box until the abutment 76 on such transferrer bears against the set screw 77. A sliding clutch 3, which can slide along the shaft 2, is provided with a bunter arm 65, so placed that, when the sliding clutch 3 is slid toward the transferrer, the bunter arm 65 comes opposite to a bunter 5 fixed to the slay 6, and, when the slay moves forward, the bunter 5 engages with the bunter arm 65 and turns the sliding clutch 3. When however the sliding clutch 3 is in the position shown in the drawings, the bunter arm 65 is clear of the bunter 5 and therefore the sliding clutch 3 is not turned on the forward movement of the slay. The sliding clutch 3 is also provided with a flat face 71, which is adapted to engage with a corresponding flat face 72 on the transferrer when the sliding clutch 3 is slid toward the latter. These two flat faces 71 and 72 are so disposed that, when the sliding clutch 3 is turned by the bunter 5, they engage one with the other and cause the transferrer to turn with the sliding clutch 3. The transferrer, on being turned in this way, takes a cop from the magazine and presses it into the shuttle.

The means whereby the cop is held in a suitable position to be taken by the transferrer and guided into the shuttle under the action of the transferrer does not form part of the present invention and will not therefore be described.

From the foregoing it will be seen that when the sliding clutch 3 is in the position shown in the drawings, the bunter arm is clear of the bunter 5, so that no part of the mechanism which forms the subject of this invention is actuated. When however it is moved toward the transferrer, the forward motion of the slay causes the transfer of a cop from the magazine into the shuttle. The sliding clutch 3 is moved toward the left of Figs. 1 and 2, to cause a cop to be transferred by mechanism actuated by the weft-fork holder or other part of the weft-stop motion as follows: A rod 50 is connected to the weft-stop motion in such a way that it is moved toward the transferrer on failure of weft. The rod 50 is fixed to a piece 51 mounted on the shaft 2 and capable of sliding on it. The piece 51 has two forked arms 54 and 52, the latter of which is connected to it by a bridge piece 64. The forked arm 52 engages in a groove formed in the end of the sliding clutch 3, so that this latter has to partake of the sliding motion given to the piece 51 by the rod 50, but is free to turn independently of the fork 52 or the piece 51. When therefore on failure of the weft the rod 50 is moved toward the transferrer, the sliding clutch 3 is also moved in the same direction and, as described above, causes transfer of a cop.

The fork 54 engages in a groove in the boss 55 fixed to a shaft 56 supported by a bracket 58 in which the shaft can turn and also slide endwise. An arm 62 projects horizontally from the boss 55 and carries at its end a vertical rod 61. This rod actuates the cop-feeding and weft-carrying mechanism of the magazine by means of the pawl and ratchet wheel 93 (Figs. 6 and 7). The parts numbered 55 to 62 are shown only in Fig. 2. The shaft 56 carries a bunter arm 59 fixed to it. This bunter arm 59 is opposite the bunter 60 on the slay 6 when the shaft 56 is slid toward the transferrer, but it is clear of it when the shaft is slid away from the transferrer. The shaft 56 partakes of the sliding motion of the rod 50 through the medium of the fork 54 and consequently, when the rod 50 is moved toward the transferrer to effect transfer of a cop, the bunter arm 59 is brought into the position to be turned by the bunter 60 on the forward movement of the slay, thus actuating the cop-feeding and weft-carrying mechanism of the magazine to feed forward a fresh cop ready for the next transfer. The shaft 56, after having been turned, is brought back into its original position by means of a spring (not shown) which can be attached to it in any convenient manner.

A blade spring 69 engages with a projection 70 on the sliding clutch 3, and returns this latter to its normal position after it has been turned by the bunter 5. Its normal position is determined by a set screw 68. The face 72 on the transferrer which engages with the face 71 on the sliding clutch 3, may be extended to the right so that the two faces are always in engagement, or the sliding clutch 3 may be mounted on the shaft 2 on a feather.

From the above description it will be seen that our transferrer-actuating mechanism introduces into the loom no extra working parts which operate during the normal working of the loom.

In weft-replenishing mechanism adaptable to ordinary over-pick looms, the cop is inserted in the shuttle from above, and presses out the cop previously in the shuttle, through an opening in the bottom of the shuttle race. Now, to press one cop out and put the other in requires a considerable force, and it has been found that the transferrer which performs this function must give a direct, or substantially direct, downward pressure on the cop at the moment when it is being pressed into the shuttle. If the pressure is not directly downward, only a portion of the force exerted by the transferrer is employed in pressing the cops out of and into the spring holder in the shuttle, and the rest is exerted against the side of the shuttle or the slay. Such indirect action greatly increases the force which has to be exerted by the transferrer, not only because part of the force is uselessly expended, but because this part causes friction which needs greater force to overcome it. This direct downward action of the transferrer is secured according to this invention, by pivoting the transferrer on an axis which is substantially on a level with the shuttle, so that the motion of the end of the transferrer is substantially downward when pressing the cop into the shuttle. If the greatest pressure is required at the moment when the cop to be inserted strikes the cop to be pressed out, the axis should be slightly above the level of the shuttle to allow for the thickness of the cop body. In the most usual type of loom this direct downward action of the transferrer is secured by fixing the axis approximately on the level of the breast-beam, close to its back edge.

Now, in weft-replenishing mechanism for over-pick looms the cop magazine must be clear of the picking mechanism, and since it is objectionable that it should project behind the front or side of the loom, it must be a substantially flat magazine in which the cops are held one above another, either vertically or at a slight inclination. In order to secure the direct downward action of the transferrer with such a magazine, and at the same time to avoid an objectionably long motion of the transferrer, it is necessary that the cop to be inserted into the shuttle, be in the path of the transferrer in a position slightly below the transferrer and as close as possible to the shuttle. With the magazine of the type mentioned above, such a position is possible for the lowest cop, only if there be a considerable space between this cop and the one above, and also it is generally possible only if the lowest cop be farther back than the others. These features are obtained in our magazine, by retaining the cop to be transferred, independently of the rest of the cops in the magazine, and allowing the lowest cop in the main portion of the magazine to drop into a position in the path of the transferrer where it is yieldingly retained on the back stroke of the transferrer after transferring a cop. By this device the main portion of the magazine with the attached gear, can be kept forward clear of the picking mechanism while the cop to be transferred, which need have only a narrow retaining jaw behind it, can be farther back and still clear of the picking mechanism.

The magazine itself is made as flat as possible, so that while clear of the picking mechanism it does not project in front of the loom, by mounting two endless chains on a plate or framework with their axes at right angles to the plate so that the wheels are in the same plane. The cops are held in the same plane by carriers fixed to or formed with the links of the two chains. The chains are carried on four chain wheels or two chain wheels and two pulleys, the two upper chain wheels being partly rotated each time a cop is transferred. This arrangement of chain carriers admits of a very simple automatic release of the lowest cop, because when the chains begin to take the curvature of the lower wheels, the carriers are separated and, if suitably shaped, allow the cop to fall into the path of the transferrer.

At the point where the cops are released from the chains, two pairs of jaws are fixed to the magazine frame, the space between the jaws of each pair forming a guide which guides the skewers of the cop, one pair taking the skewer between its head and the cop, and the other pair the tip of the skewer. It is preferable to guide the skewer itself and not the head, so as to make the space occupied by the back jaws a minimum. Each pair of jaws leaves, for the skewer, a free passage down to the position which the cop has to take up in the path of the transferrer. Beyond this position the space is normally too narrow for the skewer to pass, but one of the jaws of each pair is mounted on a pivot or a spring and is pressed toward the other jaw by a spring, so that when pressure is applied to the cop by the transferrer the jaw yields and the cop is forced downward into the shuttle. In one arrangement, the back jaws are fixed and are so shaped that the cop released from the chains is guided to clear the transferrer and falls into its path a little below it till stopped and retained by the spring-controlled jaws, while the jaws are so shaped beyond this, that the cop, during transfer, is guided into the shuttle. It is found, however, that jaws so shaped are too far back to clear the picking mechanism, as this is arranged in an ordinary loom, and, to give the necessary clearance, the whole magazine is pivoted at or near its top, and is pulled back from the position in which the jaws serve to guide the cop into the shuttle, by a spring. The magazine is, in this position, clear of the picking mechanism and, when a transfer is to be effected, the magazine is moved backward, either by the action of the transferrer on the cop, or by a separate attachment to some part of the mechanism actuating the transferrer, so that at the moment of transfer the jaws are in a position to guide the cop into the shuttle.

In order to avoid moving so heavy a weight as the whole magazine, it has been found sufficient to pivot the jaws only, or, by suitably arranging the jaws, the back jaws only. In the latter case the front jaws are fixed and serve as guides, while the back jaws are pivoted and pressed forward by a spring so as to overlap the back jaws. In this way the front jaws are the part which is farthest back, thus effecting a saving of space amounting to the thickness of the back jaws and the diameter of the skewer.

Instead of the jaws themselves being pivoted, they may be mounted on a flap which is pivoted to the magazine frame, and instead of having pairs of jaws, there may be two jaws only serving as guides, while the other jaws are replaced by a flap or other device acting on any part of the cop or skewer to keep it against the guiding jaws. The term "pair of jaws" as herein employed, is intended to include all such equivalent devices.

In Figs. 4 and 5, 1 is the transferrer, mounted on a shaft 2 supported in brackets (not shown) on the breast-beam 3; 4 is the slay, 7 is the shuttle containing the cop 6. The picker spindle 125 is fixed farther back than is usual. A bunter 5 attached to the slay 4 operates the transferrer through the medium of the bunter arm 65. The transferrer 1 is shown in full lines in its position immediately after transfer, and in dotted lines in its normal position.

Referring now to Figs. 6, 6ª, 7, 8 and 9: The magazine frame 86 may be either fixed directly to the breast-beam as shown, or pivoted at its upper part on a support fixed to the top of the loom. The chain wheels 88 and 89 carrying the endless chains 98, 99 for feeding the cops, are set with their axles at right angles to, and their faces parallel with, the magazine frame and shuttle box. These axles pass through bosses cast on the face of the magazine frame 86, and at the back of the said frame they are fitted with bevel wheels 90, gearing with bevel wheels 91 secured to the shaft 92, capable of rotating in bearings behind the magazine frame, and situated near the top and parallel therewith. At one end of this shaft is fitted a ratchet wheel 93 which is moved, say, one tooth at a time by means of a pawl actuated through the vertical rod 61, when it is intended to bring a fresh skewer in position to be forced into the shuttle in the manner hereinafter described. The shaft 92 is also fitted with a disk 95 having flat faces on its periphery, which is acted upon by a spring 96 to hold it in the changed position after each movement of the ratchet wheel 93. Three chain wheels 88, 89 (before mentioned) and 97 are preferably employed. The endless chains 98 and 99 for carrying the skewers, pass around the chain wheels 88 and 89, and also around two other chain wheels or loose pulleys 100 and 101 fitted to the lower part of the magazine frame. The third chain 102 is passed around a chain wheel or pulley 105 situated at a lower level than are the pulleys 100 and 101. The skewers supplied with cops 104 are supported between the two inner flights of the chains 98, 99, and their tips either enter the links of the middle chain 99 or are placed in cups or hooked projections 107 fitted thereto, or formed integral therewith, and the said tips are prevented from end movement by a flange 108 projecting from the magazine frame. The flange also guides the chain 99. A small guide or flange is also placed on the inside of the chain 98, which is provided with cups or carriers 110 externally, for the heels of the pegs or skewers. A third rib extends longitudinally down the magazine a little beyond the cups or carriers 110 to prevent the heels of the pegs leaving their position. The third chain 102 is provided with weft holders such as pins 103, which may be extensions of the link pins, or pieces of carding brush.

We preferably make the cups or carriers 110 for the heels of the skewers integral with the links of the chain as shown in Fig. 10. Each cup is in halves, each half having three of its sides 111, 112 and 113 struck up to form half the cup, and its remaining side turned downward, and shaped to form one of the sides 114 of the chain link. When two of these integral cup links are riveted together they form the cup or carrier as shown. The cups or carriers 107 for the tips of the skewers may be constructed as shown in Fig. 11. One side 115 of the respective chain links is provided with a hook 116 for carrying the tip of the skewer. The lowermost skewer is advanced by the chains, by which it is supported, with its heel end slightly in advance of its tip end, and as the endless chains take the curvature of the pulleys 100, 101, and leave the respective perpendicular line, with the next movement of the ratchet wheel 93 of the chain feed, the lowermost cop or skewer is dropped into two pairs of jaws, a small curved or inclined guide piece 117 directing it in its fall and insuring its delivery into the jaws.

In Figs. 5, 8 and 9 are shown jaws suitable for a fixed magazine, and in Fig. 4 jaws suitable for a pivoted magazine.

In Fig. 4, 130 is the axle on which the magazine is pivoted, this axle being supported from the top of the loom. A spring, not shown, is arranged to keep the magazine in its forward position. In the drawing it is shown in its backward position, immediately after transfer of a cop. Assuming the magazine to be in its forward position, that is, with the tip of its back jaw 127 near the front of the shuttle, in which position the picking mechanism can work just clear of the jaw, a cop, after being released from the chain wheel 100, falls down the guide way formed between the two jaws 127, 128, which is so shaped that the cop can fall clear of the tip of the transferrer 1, into the position 126 shown in dotted lines in Fig. 4. On the transferrer being actuated by the bunter 7 acting on the arm 65, the cop is pressed down between the fixed jaw 127 and the spring-pressed tip 129 of the jaw 128, and, at the same time the whole magazine is pressed forward into the position shown in the drawing, when the back jaw 127 takes up a position in which it guides the cop into the shuttle. This jaw is also so shaped that the cop just clears the picker spindle 125.

In Figs. 8 and 9 are shown the jaws of the fixed magazine shown in Figs. 6, 6ª, and 7. Here the back jaws 119 and 121 are fixed each to a flap 122 hinged to the magazine frame 86 at 123. In Fig. 9 the back jaw 119 overlaps the front jaw 118, which is fixed and serves as a guide to the cop during transfer. A small gap may be left between the tips of the jaws retaining the tip end of the skewer, to allow free passage for the weft.

In Fig. 5 are shown in full lines the jaws of a fixed magazine in their normal position. The dotted lines show the position of the back jaw during passage of a cop. In their normal position the back jaws are just clear of the picking mechanism. The cop released from the chains 98, 99, falls just clear of the tip of the transferrer 1, into the position shown in dotted lines at 126, where it is in the path of the transferrer, below it and close to the shuttle. With the cop in this position the transferrer 1 can bear on its upper part and only a short stroke is required to force the cop into the shuttle.

In the case of the pivoted magazine shown in Fig. 4 the jaws are shaped so as to guide the cop past the tip of the transferrer and so avoid an unnecessarily long stroke for the transferrer.

It will be seen that our pivoted magazine or magazine with pivoted jaws, in which the cop to be transferred is retained as far back as possible and is in the path of and below the transferrer, while the other cops are independently retained above the transferrer, enables the axis of the transferrer to be raised until it is on a level with, or slightly above, the shuttle, so that the cop is forced into the shuttle with a direct downward push without loss of energy such as would be caused by the cop striking the sides of the shuttle.

The power required to effect the transfer of a cop is derived from some moving part of the loom such as the slay; such part of the loom however, moves at every pick, while a cop has to be transferred only on failure of weft. The transfer mechanism must therefore be connected to the moving part of the loom, not directly, but through a device which connects them only when transfer of a cop has to be effected. One form of transfer mechanism with a device for determining its actuation by the slay has been hereinbefore described with reference to Figs. 1, 2 and 3, and in that arrangement the transfer of a cop is determined by the end motion of a rod running along the breast-beam and close behind it, and the following description of our invention relates to the means for giving the required end motion to the said rod.

Fig. 12 shows the breast-beam 17 of an ordinary loom with weft fork hammer 31, weft fork 35 on the holder 10 with spring 11 to return it to its normal position, weft-fork slide-lever 4 pivoted to the shuttle stand at 24, and knock-off lever 38. The weft-fork holder 10 slides through holes in the lugs 15 of the bracket 16. A block 12 fixed by set screw 13 to the weft fork holder 10, bears against the portion 43 of the lever 4, so as to move the lever 4 forward when the weft fork holder is actuated on failure of weft. A portion of the lever 4 is cut away behind the knock-off lever 38, so that the forward motion of the lever 4 imparted to it by the weft fork holder does not release the knock-off lever to stop the loom. An extended portion 42 of the lever 4 is attached to a bell-crank lever 44 by means of a coupling 46 and 47. The bell-crank lever 44 is pivoted to the breast-beam at 45, and its other end is attached to the rod 50 which is attached to the mechanism at the right-hand end of the breast-beam which determines the transfer of a cop. On failure of weft, the forward motion of the lever 4 causes the end 47 of the bell-crank lever 44 to move forward, and the other end, with the rod 50, to move to the right and thus determine the transfer of a cop.

The coupling 46 and 47 (Fig. 14) consists of a piece 46, pivoted to the extension 42 of the lever 4 so that it can be engaged with a projection 47 on the bell-crank lever 44, as shown in the drawings, or can be turned so as to be disengaged from the projection 47. In the latter case, the weft-replenishing mechanism is put out of action. The lever 4 is returned to its normal position by a spring (not shown) in the usual manner.

A lever 23, of which an enlarged view is shown in Fig. 13, is pivoted to the breast-beam, preferably on the stud 24 on which the lever 4 is pivoted, and is so placed as to release the knock-off lever 38 on its forward movement. The lever 23 carries a disk 21 pivoted to it at 22. A spring 41 tends to turn this disk until a lug 37 on the underside of the disk (shown in dotted lines in Fig. 13) bears against a projection 39 on the lever 23.

The disk 21 has two teeth 20 and 36, adapted to be engaged by the pawl 18 (Fig. 15) pivoted at 19 to the block 12, on the forward motion of the latter. In the normal position of the disk 21, the lug 37 is against the projection 39, and the tooth 36 is in position to be engaged by the pawl 18. On the forward motion of the block 12, consequent on failure of weft, the disk is turned against the spring 41 by the action of the pawl 18 on the tooth 36, until the lug 37 abuts against the front edge of the lever 23 as shown in the drawings. The disk is retained in this position by a pawl 28 engaging with a tooth 32 on the disk. The pawl 28 is pivoted to a bracket 27 fixed to the breast-beam. On the return motion of the block 12 the pawl 18 slips over the tooth 20 by turning on its pivot and all the parts are then in the positions shown in the drawings.

It will be seen from the foregoing that, on the first failure of weft, the forward motion of the block 12 determines the transfer of a cop and does not stop the loom because the pawl 18 turns the disk 21 on the lever 23 instead of moving forward the lever 23 to release the knock-off lever 38. If now, the weft be successfully replenished, the block 12 is not moved forward on the next pick from right to left, and the screw 30 attached to a projection from the weft fork hammer 31 strikes an extension 29 of the pawl 28, so as to move the latter clear of the tooth 32 on the disk 21 and allow the disk to return to its normal position under the action of the spring 41. If, however, the weft be not successfully replenished, on the next pick from left to right the block 12 is again moved forward and then the pawl 18 engages with the second tooth 20 on the disk 21. The pawl, however, cannot turn the disk 21 any farther, by reason of the lug 27 thereon, then being against the front edge of the lever 23, and therefore the action of the pawl 18 on the tooth 20 serves to move forward the disk 21 together with the lever 23 and thus to stop the loom by releasing the knock-off lever 38. The lever 23 is returned to its normal position by a blade spring 9 engaging in a slot in a projection of the lever 23. By adding a third tooth to the disk 21 beyond the tooth 20, and a second tooth beyond the tooth 32 and diminishing the length of the lug 37, the lever 23 can be moved to stop the loom on the third instead of on the second failure of weft.

Our invention is not confined to giving endwise movements to the rod 50 since any desired form of movement can be given to the device determining the transfer of a cop by interposing suitable levers between the extension 42 and the aforesaid device.

Having described our invention, we declare that what we claim and desire to secure by Letters Patent is:—

1. In weft replenishing mechanism for looms, the combination of a bunter on the slay actuating the transferrer, a transferrer pivoted on a shaft, and a bunter arm also pivoted on the said shaft, and capable of sliding motion longitudinally of the said shaft, such sliding motion being controlled by some part of the weft stop motion, to bring the bunter arm into position to be struck by the bunter, the bunter arm being then clutched to the transferrer so as to operate it.

2. In weft-replenishing mechanism for looms, the combination with the picker spindle situated immediately over the shuttle box, and means operative to insert from above cops into a shuttle in the said shuttle-box, of a transferrer, and a pivot for the transferrer fixed to the breast-beam at a point close to the back edge of the same, and on a level with the shuttle.

3. In weft-replenishing mechanism for looms the combination with two endless chains adapted to operate in the same plane, of two pairs of chain wheels operatively connected to the chains and adapted to rotate also in that plane, and means fast to the chains adapted to support the cops between adjacent flights of the two chains.

4. In weft-replenishing mechanism for looms, the combination with a cop magazine and a picker spindle situated over the shuttle box, of front and back jaws on the magazine adapted to guide the cop during transfer and prevent its tilting, both front and back jaws extending below the picker spindle to points at which they just clear a shuttle in said shuttle box.

5. In weft-replenishing mechanism for looms, the combination with a stationary cop magazine, a pivoted cop transferrer, and a picker spindle above the shuttle-box, of jaws adapted to guide the cops into a shuttle in said shuttle-box, pivots connecting the jaws to the magazine about which the jaws are adapted to rock into the path of the picker spindle during the passage of a cop along the jaws and out of the said path immediately after the cop has left the jaws.

6. In weft-replenishing mechanism for looms, the combination with two endless chains in one plane and means fast to these chains adapted to support the cops between adjacent flights of the two chains, of a third endless chain in the said plane, gears operatively connecting the three chains, and means fast to the third chain adapted to hold the weft of the cops.

7. In weft-replenishing mechanism for looms, the combination with the slay, breast-beam, and weft stop-motion mechanism, of a bunter on the slay, a cop transferrer pivotally mounted on the breast-beam, a bunter arm mounted axially with the cop transferrer and movable in the direction of its pivotal axis so as to be in engagement with the cop transferrer, and means operatively connecting said bunter arm with the weft stop motion mechanism, said means acting to bring the bunter arm into and out of the path of the bunter.

8. In weft-replenishing mechanism for looms, the combination with the picker spindle situated immediately over the shuttle-box, and means operative to insert from above cops into a shuttle in the said shuttle-box, of a transferrer pivoted to the breast-beam at a point on a level or substantially so with the shuttle, and close to the rear edge of the said breast-beam.

In witness whereof we have hereunto set our hands in the presence of two witnesses.

JOHN WHITTAKER.
RICHARD BRADSHAW.
JOSEPH BRIGGS.

Witnesses:
ERNALD SIMPSON MOSELEY,
MALCOLM SMETHURST.

Copies of this patent may be obtained for five cents each, by addressing the "Commissioner of Patents, Washington, D. C."